Oct. 1, 1968 H. JAFFE ETAL 3,404,296

TRANSDUCER HAVING A TRANSITION FROM A FERROELECTRIC STATE TO AN ANTIFERROELECTRIC STATE

Filed July 16, 1963 5 Sheets-Sheet 1

INVENTORS
HANS JAFFE
DON A. BERLINCOURT
BY
[signature]
ATTORNEY

Oct. 1, 1968 H. JAFFE ETAL 3,404,296

TRANSDUCER HAVING A TRANSITION FROM A FERROELECTRIC STATE TO AN ANTIFERROELECTRIC STATE

Filed July 16, 1963 5 Sheets-Sheet 2

INVENTORS
HANS JAFFE
DON A. BERLINCOURT

BY James A. Smith

ATTORNEY

INVENTORS
HANS JAFFE
DON A. BERLINCOURT
BY
James A. Smith
ATTORNEY

Oct. 1, 1968 H. JAFFE ETAL 3,404,296

TRANSDUCER HAVING A TRANSITION FROM A FERROELECTRIC STATE TO AN ANTIFERROELECTRIC STATE

Filed July 16, 1963 5 Sheets-Sheet 4

INVENTORS
HANS JAFFE
DON A. BERLINCOURT

BY

ATTORNEY

Oct. 1, 1968 H. JAFFE ETAL 3,404,296
TRANSDUCER HAVING A TRANSITION FROM A FERROELECTRIC STATE
TO AN ANTIFERROELECTRIC STATE
Filed July 16, 1963 5 Sheets-Sheet 5

INVENTORS
HANS JAFFE
DON A. BERLINCOURT
BY James A. Smith
ATTORNEY 3,404,296

TRANSDUCER HAVING A TRANSITION FROM A FERROELECTRIC STATE TO AN ANTIFERROELECTRIC STATE

Hans Jaffe, Cleveland Heights, and Don A. Berlincourt, Chagrin Falls, Ohio, assignors to Clevite Corporation, a corporation of Ohio Filed July 16, 1963, Ser. No. 295,422
6 Claims. (Cl. 310—8)

This invention relates to electromechanical transducers and transducing methods and, more particularly, to an improved transducer and method of converting a mechanical force into a high energy electrical effect.

In general the invention pertains to electromechanically active ferroelectric materials and comprises a method of mechanically effecting the transition of materials having predetermined characteristics from a ferroelectric state to an antiferroelectric state with an accompanying release of electrical energy.

The forrelectric phenomena possessed by many crystals and ceramic materials is well known to those skilled in the art. Rochelle salt was the first ferroelectric crystal discovered, followed by the later discovery of ferroelectriricity in potassium dihydrogen phosphate. More recently, certain ceramic compositions have been found to possess ferroelectric properties.

Characteristic of ferroelectric materials is the existence of "domains" consisting of regions within each crystal which have a spontaneous electric polarization. Prior to polarization of the ceramic material the domains are randomly orientated and the respective charges are self-neutralizing. Upon application of an electric field, however, the spontaneous polarization of each domain tends to take one of the allowed directions (dependent upon crystal structure) most nearly parallel to the applied electric field to form polarized dipoles to result in a remanent polarization parallel to the direction of the poling electric field. The allowable directions in ferroelectric perovskite materials are: tetragonal, along a cube edge; rhombohedral, along a cube diagonal; and orthorhombic, along a face diagonal.

Such polarized ceramics commonly possess a characteristic of being piezoelectric and have geen used extensively as electromechanical transducers. The application of mechanical stress or strain to a ferroelectric will result in a change in polarization which in turn results in generation of an electrical signal. When the stress or strain is removed the material will return to its initial state of polarization. Similarly the application of an electric potential will cause the ceramic material to undergo an elastic deformation.

The electrical energy released as a result of the piezoelectric effect is significant and has rendered such materials applicable as power supplies such as, for example, an ignition system for internal combustion engines. For example, a mechanical energy input in the order of 0.04 joules/cm.$^3$ in the case of material such as disclosed in U.S. Letters Patent No. 2,906,710 to Frank Kulcsar and Clarence G. Cmolik will result in the generation of approximately 0.02 joules/cm.$^3$ of electrical energy in the linear output range. Higher output can be obtained by mechanically driving a piezoelectric element beyond the linear output range where depoling occurs. The difficulty of repoling the piezoelectric material and the possibility of electric failure of the material during the repoling, however, renders such non-linear operation impractical, and in practical effect, the output is limited to that obtained in the linear output range.

While the energy released by the ferroelectrics as a result of the piezoelectric effect is significant, we have found that a significantly greater and more abrupt energy release can be accomplished with respect to certain ferroelectrics by inducing a transition of the material from a poled ferroelectric state to an antiferroelectric state. There is no net polarization in an antiferroelectric domain, and thus the remanent polarization disappears when the transition takes place. The surface charge neutralizing the remanent polarization in the ferroelectric state is thus released and may be used to perform work.

More particularly, we have discovered that such a transition may be induced with respect to materials located close in composition to the ferroelectric-antiferroelectric phase boundary (at a given temperature) by the application of hydrostatic pressure or a directional stress. The resulting energy release in this case is in the order of 0.5 to 1.0 joules/cm.$^3$ and thus significantly greater than the energy released as a result of the piezoelectric effect.

It is, accordingly, a principal object of the invention to provide an improved method of converting mechanical energy to electrical energy.

Another object of the invention is to mechanically induce a transition of a ceramic material from a ferroelectric to an antiferroelectric state.

Another object of the invention is to effect generation of electrical energy by a ferroelectric material by mechanically inducing a transition of the material from a ferroelectric to an antiferroelectric state.

Another object of the invention is to provide an improved mechanical to electrical transducer.

Other objects and advantages will become apparent from the following description taken in connection with the accompanying drawings wherein:

FIGURES 1(*a*), 1(*b*) and 1(*c*) are polarization field hysteresis diagrams for different classes of materials suitable for practice of the invention;

Figure 2:
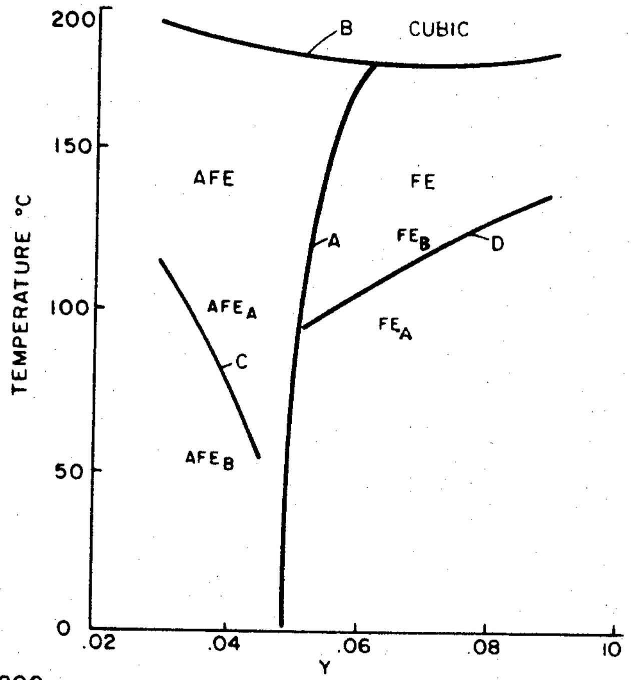
FIGURES 2 and 3 are composition-temperature phase diagrams for two compositional groups.

The invention is applicable to ceramic materials located close in composition to the ferroelectric-antiferroelectric phase boundary of a composition-temperature phase diagram. The essence of the invention is the generation of electrical energy by mechanically inducing a transition from the ferroelectric state to the antiferroelectric state such as by the application of a hydrostatic pressure or a directional compressive stress.

The invention is not limited with respect to certain ceramic compositions but is generally applicable to ceramics of the aforementioned type having a ferroelectric state reasonably close to the ferroelectric-antiferroelectric phase boundary. The mechanical input required to effect a phase transition has been found dependent on the distance of the composition from the phase boundary on a temperature-composition phase diagram and will be minimum in the case of the borderline compoistions. Accordingly, compositions are preferable which are in close compositional proximity to the phase boundary.

Numerous known perovskite ceramic compositions posses the above-mentioned characteristics and are suitable for practice of the invention including those disclosed in copending application Ser. No. 135,396 filed Aug. 4, 1961 by Bernard Jaffe et al. abandoned in favor of continuation-in-part application Ser. No. 434,858, filed Feb. 24, 1965, now abandoned. Particularly suitable is lead zirconate modified by the partial substitutton of titanate and stannate for zirconate as expressed by the compositional formula:

$$PbZr_{1-v-y}Sn_vTi_yO_3$$

where the sum of $v$ and $y$ is less than .50 and where y is more than .03 and less than .20.

As is well known in the ceramic art hafnium oxide may replace zirconium oxide in equal molecular proportions without substantially modifying the properties and such partial substitution may be effected with respect to the compositions noted above.

It is likewise known that electrical properties of lead zirconate titanate solutions can be improved by the substitution for one of the principal metallic elements of an element of higher valency in amounts of 0.1–3.0 atom percent. Examples of such substitutions are the replacement of bi-valent lead by tri-valent lanthanum or tri-valent bismuth, or the replacement of 4-valent zirconium by 5-valent niobium or 5-valent tantalum or 5-valent antimony. For a specific disclosure of such higher valency substitution reference is made to copending applications Ser. Nos. 225,320 and 225,202, filed on Sept. 21, 1962 by Frank Kulcsar, both now abandoned, and U.S. Patent No. 2,911,370 to the same inventor.

It is also known that barium, calcium, and/or strontium may be substituted for lead in equal atomic percents. In this case the limits on $v$ and $y$ in the above equation are modified. More calcium and strontium favors the antiferroelectric state and barium favors the ferroelectric state.

Also suitable for practice of the present invention is sodium niobate modified by the partial substitution of potassium, cadmium, or lead for sodium in amounts of 0–20 mol percent.

The relative proportions in the above compositions determine the location of the composition with respect to the ferroelectric-antiferroelectric phase boundary and thus are related to the mechanical input required to effect a phase transition. Appropriate values may be readily determined from the temperature-composition phase diagrams hereinafter to be described.

The above compositional modifications may be used in various combinations to produce workable compositions. Particularly suitable for practice of the invention are compositions such as the following, which will hereinafter be specifically described for the purpose of illustrating the characteristics of several usable compositions:

$$Pb_{.995}Nb_{.01}[(Zr_{0.8}Sn_{0.2})_{1-y}Ti_y]_{.99}O_3$$

$$Pb_{.995}Nb_{.01}[(Zr_{0.7}Sn_{0.3})_{1-y}Ti_y]_{.99}O_3$$

*Polarization field hysteresis diagrams*

Perovskite ceramics can be ferroelectric under various conditions. For example, some ceramic compositions are found to be initially ferroelectric upon cooling subsequent to firing and need only be poled to render the material suitable for practice of the invention.

Other materials which initially exhibit antiferroelectric properties can be rendered ferroelectric by the application of a high electric field and will remain ferroelectric upon removal of the field. Still other materials having an initially antiferroelectric state become ferroelectric during the application of a bias field and return to the antiferroelectric phase upon removal of the field. Thus materials suitable for practice of the invention may be generally classified as follows:

(a) Initially ferroelectric or "virgin" ferroelectric compositions requiring only poling;

(b) Initially antiferroelectric compositions which can be rendered ferroelectric by the application of an electric field; and (c) Antiferroelectric compositions which exist in a ferroelectric state during existence of a bias field.

Figure 1A:
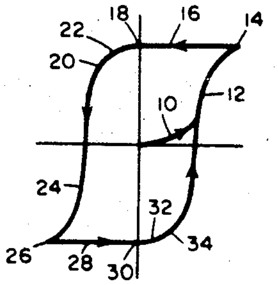
Figure 1B:
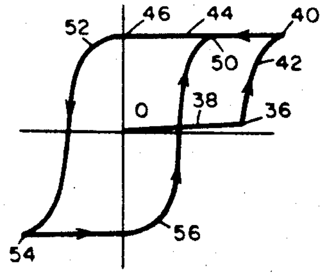
Figure 1C:
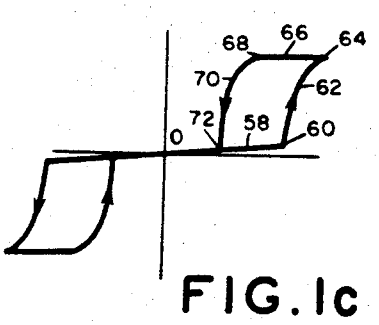

FIGURES 1(*a*), 1(*b*) and 1(*c*) of the drawings are schematic polarization field hysteresis diagrams for material classifications *a*, *b* and *c*, respectively, which illustrate generally the achievement of a poled ferroelectric state in each of the defined ferroelectric compositional classifications. Such diagrams may be readily obtained for a particular composition by measuring the electric charge on a material sample with change in applied electric field. In FIGURES 1(*a*), 1(*b*) and 1(*c*) the applied electric field E (kilovolts/cm.) is the abscissa and the electric charge P ($\mu$ coulombs/cm.$^2$) is the ordinate.

Referring specifically to FIGURE 1(*a*), which is a polarization field hysteresis diagram for "virgin" ferroelectric compositions of classification *a*, when a polarization field is applied and progressively increased with respect to an unpoled ferroelectric composition the unit electrical charge will increase gradually from zero nonlinearly along curve section 10. At a predetermined value of polarization field a sharp increase in electrical charge will occur as illustrated by curve segment 12. At point 14 the maximum charge and saturation occurs and further increase in the field will produce insignificant variations in electrical charge. Thus, at point 14 the material is "saturation" poled. Upon removal of the poling field the charge will be retained as illustrated by curve segment 16 between points 14 and 18, the applied poling field being zero at point 18. The hysteresis effect is illustrated by reversing the polarity of the poling field on a charged poled sample (point 18).

As illustrated by FIGURE 1(*a*) a very slight charge loss will occur between points 18 and 20 along curve segment 22 as the negative field is increased. Further increase in the negative field, however, will result in a complete reversal in charge polarity as illustrated by curve segment 24 between points 20 and 26. If the applied negative field is now removed the negative charge will remain as illustrated by curve segment 28 between points 26 and 30. Application of a positive field will now effect a slight decrease in the negative charge as illustrated by curve segment 32 between points 30 and 34 whereupon further increase in the positive charge will cause a complete charge polarity reversal to complete the hysteresis loop. The hysteresis loop thus achieved is analogous to the hysteresis loops of magnetic materials.

At points 14 and 26 maximum positive and negative poling is achieved, the polarity being dependent on the applied field polarity.

FIGURE 1(*b*) illustrates the different polarization field hysteresis loop for materials of classification *b* (initially antiferroelectric). In this case initial application of a positive electric field to the antiferroelectric maetrial produces a very slight increase in charge from zero to point 36 as represented by curve segment 38. Further increase in electric field from point 36 to point 40 will result in a sharp increase in electric charge as represented by curve segment 42, the maximum charge and saturation occurring at point 40. Additionally, between points 36 and 40 an antiferroelectric to ferroelectric transition occurs and at point 40 the material exists in a poled ferroelectric state. Upon removal of the electric field the material will remain poled and retain the electric charge as shown by curve segment 44 between points 40 and 46. Once the poled ferroelectric state is achieved materials in class *b* will have a polarization hysteresis loop defined by points 50, 52, 54 and 56 with application of negative and positive fields similar to materials in class *a* and further description is therefore deemed unnecessary.

Materials in class *c* have a different and distinct polarization hysteresis loop as shown in FIGURE 1(*c*) due to the inherent transition of these materials back to an antiferroelectric state upon removal of the electric field. More specifically, the initial application of a positive electric field will result in a slight increase in electric charge, along curve segment 58 from zero to point 60. Further increase in electric field will cause a sharp increase in electric charge along curve segment 62 to point 64. Along the steepest portion of segment 62 a transition from an antiferrolectric to a ferroelectric state occurs, the material being in a poled ferroelectric state at point 64 and possessing maximum electric charge. A decrease in the applied positive field will produce a slight decrease in electric charge along curve segment 66 to point 68 whereupon further decrease in field will cause a sharp decrease along curve 70 between points 68 and 72 to complete the positive hysteresis loop. Along curve segment 70 a transition back to the antiferroelectric state occurs indicating that a bias field of at least the magnitude corresponding to point 68 must be continuously maintained to retain the materials in class *c* in a ferroelectric state. The negative hysteresis loop to the left of the ordinate is identical to the positive loop and obtained in the same manner by application and removal of a negative field.

The polarization field hysteresis diagrams of FIGURES 1(*a*), 1(*b*) and 1(*c*) are representative of compositions in classifications *a*, *b* and *c*, respectively, previously described, and will vary slightly in configuration and magnitude with different compositions. In general, for most lead zirconate compositions within class *a* an electric field of at least 7 kv./cm. is necessary to effect poling of the "virgin" ferroelectric material; and the maximum charge obtained is in the vicinity of 30 micro-coulombs/cm.$^2$. For compositions within class *b* an electric field of 20–30 kv./cm.$^2$ is required to effect an initial antiferroelectric to ferroelectric transition and a maximum charge of 25–30 micro-coulombs/cm.$^2$. Once rendered ferroelectric re-poling may be accomplished with respect to class *b* materials by application of an electric field in the order of 5–7 kv./cm. For compositions within class *c* an electric field of at least 30 to 40 kv./cm. is necessary to effect an antiferroelectric to ferroelectric transition and a maximum charge of approximately 30 micro-coulombs/cm.$^2$, while a bias field of approximately 25 kv./cm. is necessary to maintain the ferroelectric state.

The above generalized description of characteristic ferroelectric classes is provided to convey an understanding of methods by means of which a poled ferroelectric state may be induced. Materials of class *a* existing naturally in a ferroelectric state and only requiring poling are as suitable for practice of the invention as the materials of classes *b* and *c* where the ferroelectric state must be artificially induced, the only requirements being that the material exist in a ferroelectric state and close in free energy to the antiferroelectric state, and that the antiferroelectric state be favored by the applied compressive stress.

With respect to class *a* materials the composition should be so chosen to produce a transition to an antiferroelectric state within a practical pressure range as hereinafter disclosed. With respect to class *b* and *c* materials the composition should be selected such that the initial transition inducing field is within practical limits.

*Temperature composition phase diagrams*

As previously mentioned particularly suitable for practice of the invention are $PbNb(ZrSnTi)O_3$ compositions. In FIGURE 2 we have illustrated a temperature-composition phase diagram for $$Pb_{.995}Nb_{.01}[(Zr_{0.8}Sn_{0.2})_{1=y}Ti_y]_{.99}O_3$$

to illustrate the relationship between temperature (ordinate) and the composition variable *y* (abscissa).

Referring specifically to FIGURE 2, the antiferroelectric phase is identified by the letters AFE while the ferroelectric phase is designated by the letters FE. Line A represents the AFE-FE phase boundary while line B represents the Curie points over the compositional range plotted. Above the Curie points a cubic phase exists which is characterized by the disappearance of the domain structure hereinbefore described.

While not particularly significant as far as the present invention is concerned, separate and distinct sub-phases exist within each of the ferroelectric and antiferroelectric phases. The antiferroelectric phase may be considered as composed of sub-phases $AFE_A$ and $AFE_B$, the boundary being designated by the reference letter C and characterized by a pronounced change in properties including permittivity. Similarly the ferroelectric phase is composed of generally two sub-phases $FE_A$ and $FE_B$ having a boundary line D characterized by a pronounced but relatively minor (less than 10%) decrease in polarization with temperature. While compoositions in the $FE_A$ phase produce optimum energy conversion efficiencies, the lower polarization in the $FE_B$ phase does not materially reduce the available electrical energy and a substantial energy release will occur during the transition from the $FE_B$ phase to the $AFE_B$ phase. Conveniently, the $FE_A$ phase usually occurs at ambient temperatures normally encountered and thus optimum conversion energy is usually achieved.

Temperature-composition pase diagrams of the type illustrated in FIGURE 2 are obtained in a fairly consistent manner. In the case of poled compositions to FE to AFE and FE to cubic transitions are determined by measurement of charge loss with rising temperature. If the temperature at which the polarization disappears corresponds to the temperature of highest permittivity, it is concluded that an FE to cubic transition has occurred. If not, it is concluded that an FE to AFE transition occurred.

Similarly FE to cubic and AFE to cubic transitions are determined by a measurement of permittivity as a function of rising temperature with the temperature of peak permittivity chosen as the transition temperature. If the ferroelectric polarization also disappears at this temperature, the transition is FE to cubic. If the ferroelectric polarization disappears at a lower temperature the permittivity peak marks an AFE to cubic transition.

AFE to FE transitions are determined by measurement of permittivity and the loss factor with rising temperatures. An inflection in the permittivity temperature curve is evidence of the transition coupled with a sharp increase in the loss factor. The determination can be insured by showing that the lower temperature phase is non-polar and that a specimen can be poled in the higher temperature phase.

$FE_A$ to $FE_B$ transitions can be determined by measurement of the decrease in polarization with temperature. In this case an inflection in the polarization-temperature curve marks the transition. Additionally substantial changes occur in electromechanical properties at the transition point along with a volume expansion.

To determine the $AFE_A$ to $AFE_B$ transitions permittivity and loss factor are measured as functions of temperature. A maximum of permittivity or at least a pronounced inflection of the permittivity-temperature curve clearly marks the transition, and there is a substantially lower loss factor in the $AFE_B$ than in the $AFE_A$ phase. The value of the loss factor is also lower in both AFE phases than in the FE phase.

In general the $AFE_A$, $AFE_B$, and cubic phases may be identified by differences in X-ray line splittings, $AFE_A$ is multiple cell orthorhombic, $AFE_B$ is multiple cell tetragonal, and cubic is a simple cubic phase. The ferroelectric states are rhombohedral, and it has not been possible to detect superstructure (cell multiplicity) in either state with ceramic specimens, but the ferroelectric states are easily identified as against the antiferroelectric and cubic states by line splittings.

Figure 3:
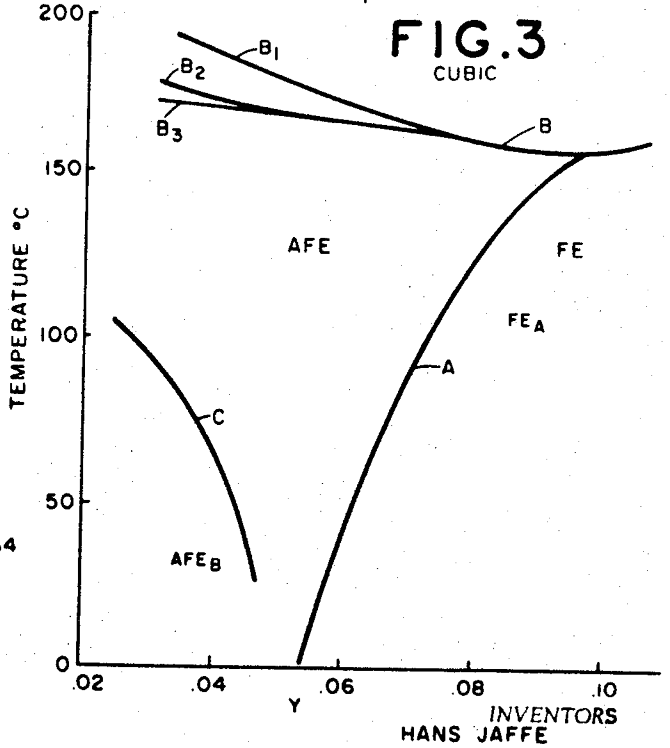

FIGURE 3 of the drawings is a composition-temperature phase diagram for the composition:

$$Pb_{.995}Nb_{.01}[(Zr_{.7}Sn_{.3})_{1-y}Ti_y]_{.99}O_3$$

and illustrates the effect of a slight change in the relative amounts of Zr and Sn on the phase locations. The compositional series of FIGURE 3 also exhibits a boundary line A between antiferroelectric AFE and ferroelectric FE phases and a Curie point line B above which lies a simple cubic phase. Several distinguishing characteristics, however, result from the compositional change. In the case of the FIGURE 3 compositional series only an $FE_A$ phase was found to exist to the right of the phase boundary line A and the boundary line C between the $AFE_A$ and $AFE_B$ phases was found to be more curved. Although not important the cubic phase in this case was found to include multiple cubic sub-phases separated and identified by the additional boundary lines $B_1$ and $B_3$. The most important change in characteristic is the change in location of the phase boundary line A. With the FIGURE 2 composition the FE-AFE boundary line A is substantially vertical exhibiting only slight temperature dependence. In the case of the FIGURE 3 composition, however, the boundary A is inclined substantially to the right and more dependent on temperature.

While the inventive concept is not dependent on the slope of the FE-AFE boundary line A, it should be appreciated that compositions having a nearly vertical phase boundary line A are most suitable in some instances in that the applied hydrostatic pressure or directional stress or strain necessary to effect a transition to the AFE phase is less dependent on temperature. For example, in the case of the FIGURE 2 compositions the compositional proximity of a particular composition to the phase boundary determines the magnitude of the mechanical energy required to effect the transition. Due to the slope of the phase boundary line A in FIGURE 3 the distance of a particular ferroelectric composition from the boundary will increase with temperature decrease and thus the required mechanical energy input will increase with decrease in temperature.

The temperature-composition phase diagrams of FIGURES 2 and 3 were determined with respect to poled ferroelectric specimens of types *a* and *b* hereinbefore described and thus compositions to the right of phase boundary A may be in either of types *a* or *b*. Compositions in class *c* which require the existence of a bias field to be ferroelectric are among those to the left of boundary A. The distinction will be more apparent from the corresponding electric field-composition phase diagrams illustrated in FIGURES 5 and 6 and the ensuing descriptive matter.

Figure 4:
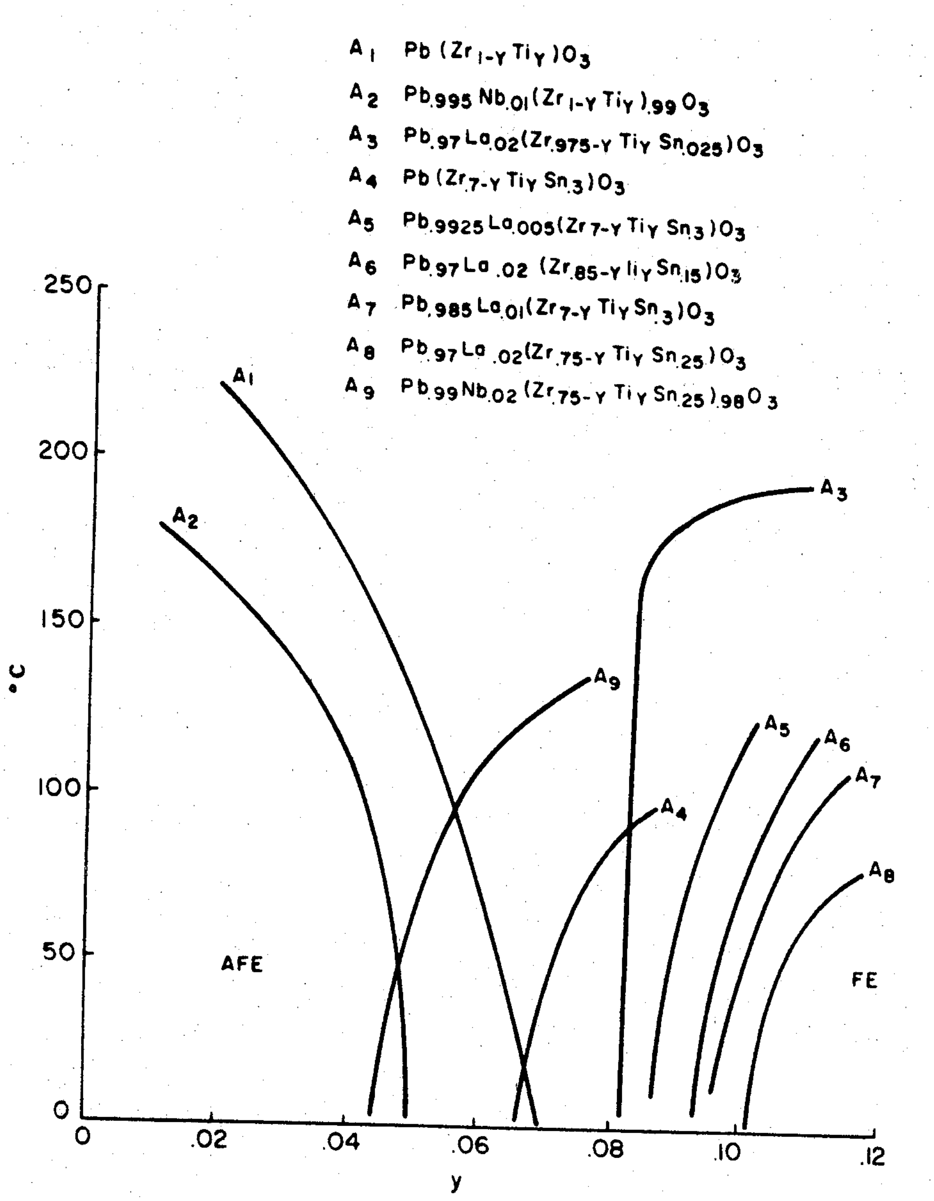
FIGURE 4 is a simplified composition-temperature phase diagram for a number of additional compositional groups.

FIGURE 4 of the drawings is a simplified composition temperature phase diagram illustrating the FE-AFE boundary curve for a number of additional compositions, wherein each boundary curve A is identified by its composition formula. Similar to FIGURES 2 and 3 the ferroelectric state exists to the right of each curve and the antiferroelectric state exists to the left. Also, similar to FIGURES 2 and 3 the curves of FIGURE 4 were determined with respect to poled ferroelectric specimens within classes *a* and *b*.

*Electric field-composition phase diagram*

Figure 5:
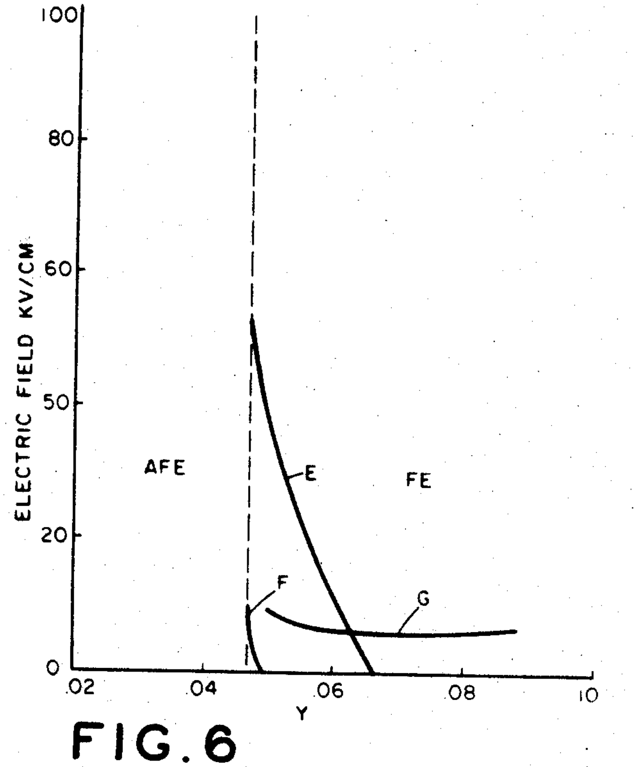
FIGURES 5 and 6 are electric field-composition phase diagrams for the compositional groups of FIGURES 2 and 3.

Referring specifically to FIGURE 5 of the drawings there is shown an electric field-composition phase diagram for the composition $$Pb_{.995}Nb_{.01}[(Zr_{0.8}Sn_{.2})_{1-y}Ti_y]_{.99}O_3$$

Specifically FIGURE 5 illustrates a range of compositions of class *b* which will undergo a transition from an antiferroelectric state to a ferroelectric state by the application of an electric field and illustrates the range of compositions which are initially ferroelectric (class *a*) and which only require poling.

Curve E in FIGURE 5 was obtained by application of an increasing electric field to sample compositions and illustrates the electric field necessary to effect an antiferroelectric to ferroelectric transition of initially antiferroelectric compositions within categories *b* and *c*. Above and to the right of Curve E the ferroelectric state exists as indicated by the letters FE while below and to the left the antiferroelectric state exists as indicated by the letters AFE. In the compositional range considered it is to be noted that compositions between $Y \cong .05$ and $Y \cong .065$ are initially antiferroelectric and rendered ferroelectric by an electric field which can be determined from Curve E.

As previously mentioned materials which undergo a transition back to an antiferroelectric state upon removal of the electric field are classified in category *c*. Materials in this category are determined from Curve F which is a plot of FE to AFE transitions with decreasing electric field. Curve F illustrates that compositions in the narrow range between $Y \cong .05$ and $Y \cong .052$ undergo a transition back to the antiferro-electric state at the indicated field magnitudes during removal of the initially applied electric field. Curve F is here an estimated curve, since no compositions in this narrow compositional range were prepared. Accordingly, materials in this compositional range are in class *c* and require the existence of a field to retain the ferroelectric state. Thus from a consideration of Curves E and F together it will be apparent that compositions below Curve F are class *c* compositions while those below Curve E between the intersections of Curve E and F with the abscissa are class *b* compositions. Compositions having a value of Y greater than .065 are initially ferroelectric and in class *a*, while compositions wherein Y is less than .046 are antiferroelectric and cannot be rendered ferroelectric by the application of an electric field up to the dielectric strength of the material.

Curve G of FIGURE 5 is a plot of coercive field magnitudes for compositions within categories *a* and *b*. The coercive field is indicated on the polarization electric field diagrams of FIGURES 1(*a*), 1(*b*) and 1(*c*) as $E_c$ and is equal to the value of electric field where the polarization hysteresis curve crosses the abscissa and is approximately equal to the poling filed.

Figure 6:
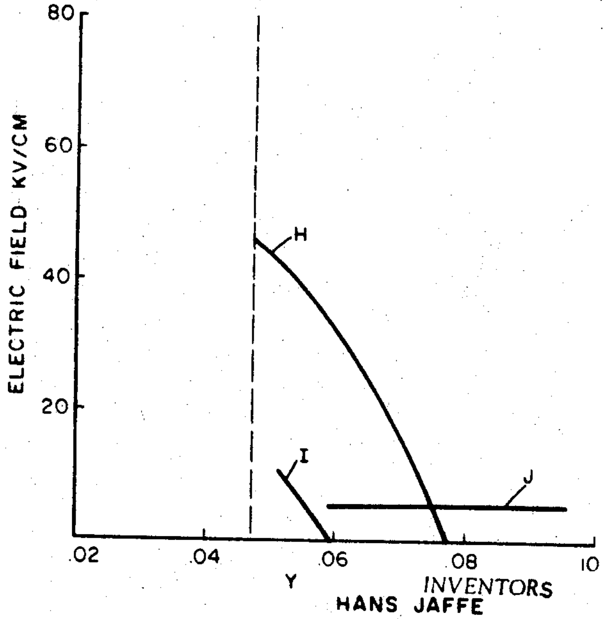

FIGURE 6 illustrates an electric field composition phase diagram for the composition:

$$Pb_{.995}Nb_{0.1}[(Zr_{.7}Sn_{.3})_{1-y}Ti_y]_{.99}O_3$$

the temperature-composition phase diagram of which is illustrated in FIGURE 3. In FIGURE 6 the Curve H represents antiferroelectric to ferroelectric transitions for compositions within categories *b* and *c* upon application of an incresaing field. Curve I represents ferroelectric to antiferroelectric transitions with a decreasing field. Curve J is the coercive field taken from polarization-electric field curves for the compositions.

It will be apparent that diagrams similar to those depicted in FIGURES 3, 4, 5 and 6 may be readily produced for other available perovskite ceramic compositions and that compositional ranges suitable for practice of the invention may be readily determined therefrom. Thus, the invention is not limited to the two specific compositions considered for exemplary purposes but may be readily practiced with other known ceramic perovskites, the suitability of which can be determined from compositional diagrams similar to FIGURES 3, 4, 5 and 6.

*Pressure and volume curves*

Figure 7:
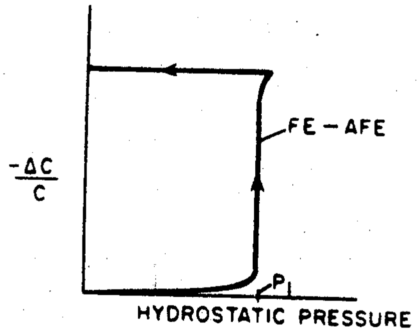
FIGURE 7 is a plot of percent loss in electric charge versus hydrostatic pressure during a ferroelectric to antiferroelectric transition.

In FIGURE 7 of the drawings we have shown schematically a curve for percent loss in electric charge C versus hydrostatic pressure during a transition from a ferroelectric state to an antiferroelectric state. As hydrostatic pressure or a directional stress is applied to a sample existing in a ferroelectric state there will be an abrupt release of electric charge at a critical pressure $P_1$ when the FE to AFE transition occurs, the magnitude of the pressure $P_1$ being dependent on the location of the sample composition with respect to the phase boundary as hereinbefore described. The curve depicted in FIGURE 7 is illustrative of the loss in electric charge during an FE-AFE transition for compositions in all of the compositional classes *a*, *b* and *c* hereinbefore described.

Figure 8:
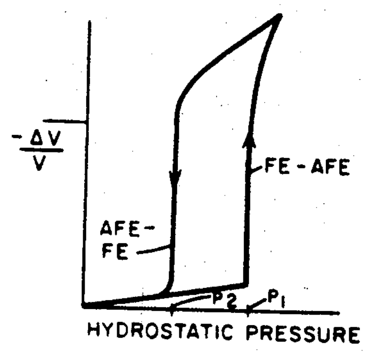
FIGURES 8 and 9 are curves illustrating change in volume with hydrostatic pressure during a ferroelectric to antiferroelectric transition.

In FIGURE 8 of the drawings there is shown a curve of percent change in volume versus hydrostatic pressure for compositions within class *a*. With increasing pressure on a ferroelectric sample a marked change in volume will occur during the FE-AFE transition at pressure $P_1$. When the pressure is subsequently reduced a transition back to the ferroelectric state will occur at a reduced pressure $P_2$.

Figure 9:
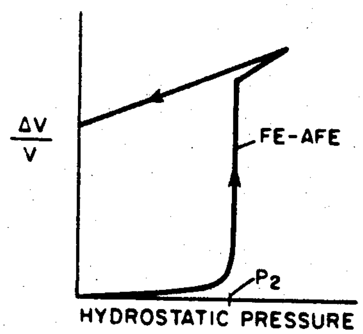

FIGURE 9 is a curve similar to FIGURE 8 for compositions within classes *b* and *c*. In this case the compositions do not return to a ferroelectric state upon removal of the pressure force and therefore do not exhibit a hysteresis loop. If the electric bias for class *b* is greater than that represented by point 60 in FIGURE 1(*c*), the material will return to ferroelectric upon release of the pressure as in FIGURE 8.

Figure 10:
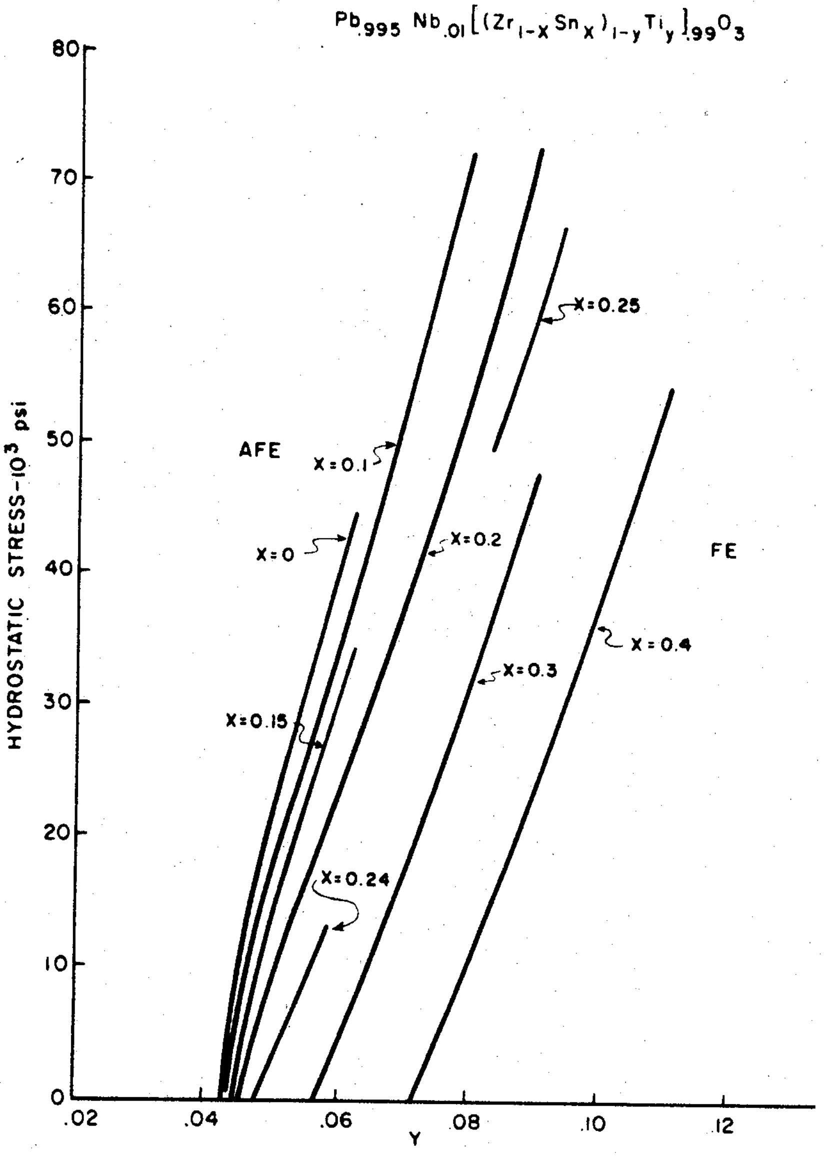
FIGURE 10 is a pressure composition phase diagram for a number of compositional groups.

Referring now to FIGURE 10 of the drawings there is shown a pressure composition phase diagram with *y* variable for increasing pressure for certain values of *x* in the composition:

$$Pb_{.995}Nb_{.01}[(Zr_{1-x}Sn_x)_{1-y}Ti_y]_{.99}O_3$$

Each curve in FIGURE 10 is the boundary line between ferroelectric and antiferroelectric phases, compositions to the right of each curve being ferroelectric and compositions to the left being antiferroelectric as indicated by the letters FE and AFE, respectively. It will be apparent that the transition pressure for compositions encompassed may be readily determined from the ordinate scale.

*Transducer*

Figure 11:
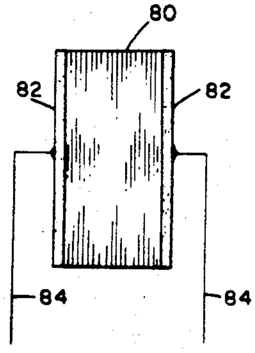
FIGURE 11 is a side view of an electromechanical transducer embodying the invention.

Ceramic compositions suitable for practice of the invention may be readily embodied into a mechanical to electrical transducer or electric energy generator. In FIGURE 11 there is shown a ceramic body 80 consisting of one of the specific ceramic compositions hereinbefore disclosed. Silver electrodes 82 are coated on two opposite faces of the ceramic body 80 and wire leads 84 are attached thereto. When the ceramic body in its polarized ferroelectric state is subjected to a unidirectional compressive stress or a hydrostatic pressure, an electric charge will be generated on the electrodes 82 at the transition pressure during the transition from the ferroelectric state to the antiferroelectric state.

If the composition of the ceramic material formed body 80 is of the class *a* type the material will turn ferroelectric upon removal of the stress and only repoling is necessary by application of an electric polarizing field in the range of 5–10 kv./cm., while the electrical output of the transducer is as high as 50 kv./cm.

If desired a polarizing field of relatively small magnitude may be continuously applied to electrodes 82 during operation of the transducer to effect automatic re-poling of the material after a transducing operation.

A similar electrical output is obtained with transducers constructed with materials of class *b* and class *c*. In the case of class *b* compositions the material remains in an antiferroelectric state after a transducing operation and an electric field of approximately 30 kv./cm. is required to effect a transition back to the ferroelectric state and repole the material. In the case of class *c* compositions a bias field of about 25 kv./cm. must be continuously maintained and a field of 30 to 40 kv./cm. applied after each ferroelectric to antiferroelectric transition to return the material to a ferroelectric state. Alternatively the 30 to 40 kv./cm. may be continuously applied.

It will be apparent that compositions in class *a* are more desirable for practice of the invention than those of classes *b* and *c* in that only repolarizing with a small electric field is required.

Figure 12:
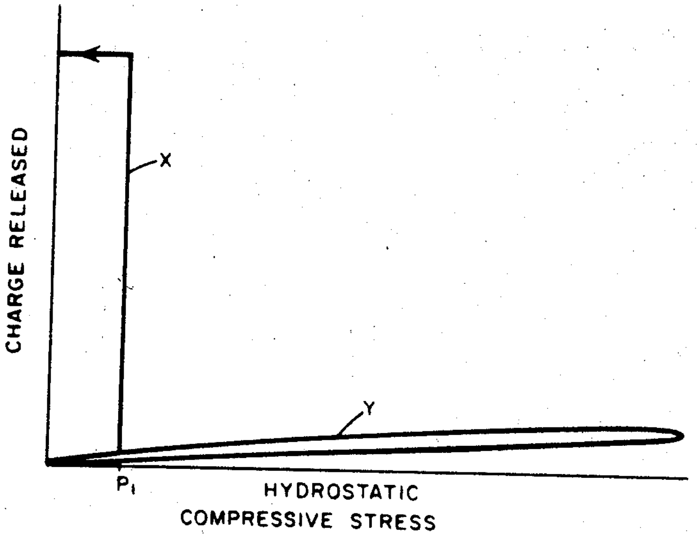
FIGURES 12 and 13 are comparative operational characteristics of a transducer embodying the invention and a prior art piezoelectric transducer.

Referring to FIGURE 12 of the drawings we have shown a graphical comparison of charge release characteristics of a transducer embodying the invention and a piezoelectric transducer representative of the prior art. More specifically there is shown a plot of remanent polarization loss with the electrodes short circuited versus hydrostatic pressure wherein curve *x* demonstrates the characteristics of a transducer embodying the invention and constructed from, for example, material having the composition:

$$Pb_{.995}Nb_{.01}[(Zr_{.7}Sn_{.3})_{.9}Ti_{.06}]_{.99}O_3$$

and wherein curve *y* demonstrates similar characteristics for a piezoelectric transducer utilizing material having the composition $PbZr_{.55}Ti_{.45}O_3$.

As will be noted in FIGURE 12 the charge release as a result of the piezoelectric effect upon application of a stress is gradual and substantially less in magnitude compared with the charge release as a result of a ferroelectric to antiferroelectric transition.

Figure 13:
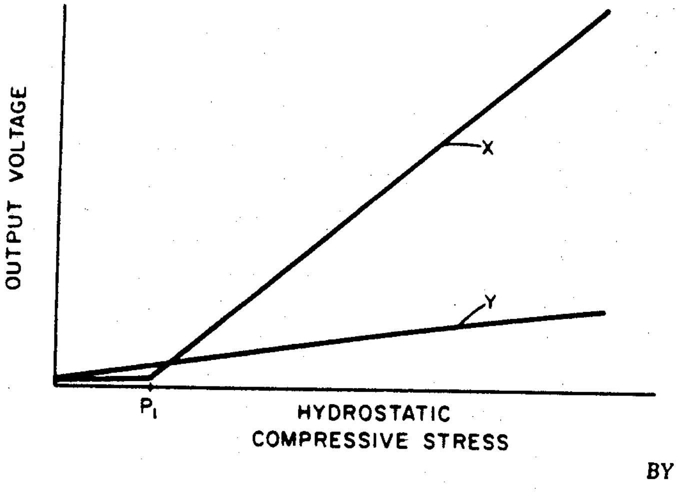

FIGURE 13 shows the voltage developed with respect to the compositions of FIGURE 12 when the stress is applied under an electric open circuit condition. It is seen that in this condition the transition pressure $P_1$ is indicative only of the onset of the transition. The generated voltage has been found to be proportional to pressure applied in excess of $P_1$ at a rate of about 1.05 volt/cm. per p.s.i. in the case of the composition under consideration. The maximum voltage attainable while under open circuit conditions is practically limited by the dielectric strength of the material to the range of 50 to 100 kv/cm. To extract electric energy from the transducer it must be connected to a load of finite impedance such that a condition intermediate open circuit and short circuit conditions results. For example, a capacitive load of .006 microfarad across a test element of one square inch in cross-sectional area and one-half inch in thickness will be charged to a voltage of 30,000 volts, corresponding to 24,000 volts/cm. of element thickness which will require 24,000/1.05 or approximately 23,000 p.s.i. hydrostatic pressure in addition to the initial transition pressure $P_1$ of about 4,000 p.s.i. A comparison of mechanical energy applied and electric energy obtained shows that the mechanical energy in excess of that required to cause a ferroelectric to antiferroelectric transition under short circuit conditions is completely converted to electric energy. For the example just stated this energy amounts to 0.35 joules/cm.$^3$.

It will be apparent to those skilled in the art that the invention is not limited to the compositions disclosed herein but may be variously practiced with ceramic perovskite compositions having a phase boundary between ferroelectric and antiferroelectric states within the scope of the invention as defined in the appended claims.

It is claimed and desired to secure by Letters Patent of the United States:

1. An electromechanical transducer comprising: a pair of electrodes; and a ceramic element interposed between said electrodes operative to undergo a transition from a polarized ferroelectric state to an antiferroelectric state upon application of a compressive mechanical stress to generate an electrical output across said electrodes.

2. An electromechanical transducer comprising: a pair of electrodes; and an element interposed between said electrodes comprising a perovskite ceramic capable of existing in either a ferroelectric or antiferroelectric state so as to undergo a transition from a ferroelectric state to an antiferroelectric state upon application of a compressive mechanical stress to said element.

3. A device for generating electric energy in response to a mechanical energy input comprising: a perovskite ceramic element having a composition located with respect to the ferroelectric and antiferroelectric phase boundary of a composition-temperature phase diagram such that a transition from a polarized ferroelectric to an antiferroelectric state can be induced by application of a compressive mechanical stress to effect release of electric energy.

4. A mechanical to electrical transducer comprising a perovskite ceramic element having a composition close to the ferroelectric and antiferroelectric phase boundary on a composition-temperature phase diagram and operative to undergo a transition from a polarized ferroelectric to an antiferroelectric state upon application of a compressive mechanical stress.

5. A mechanical to electrical transducer as claimed in claim 4 wherein said element comprises a ceramic solid solution including lead zirconate modified by the partial substitution of titanate and stannate for zirconate as expressed by the formula:

$$Pb(Zr_{1-v-y}Sn_vTi_y)O_3$$

where the sum of $v$ and $y$ is less than .60 and where $y$ is more than .03 and less than .20.

6. A mechanical to electrical transducer as claimed in claim 4 wherein said element comprises sodium niobate modified by the partial substitution of potassium, cadmium, or lead for sodium in amounts of 0–20 mol percent.

References Cited

UNITED STATES PATENTS

| | | | |
|---|---|---|---|
| 2,782,397 | 2/1957 | Young | 310—8.1 |
| 3,068,177 | 12/1962 | Sugden | 252—62.9 |
| 3,219,583 | 11/1965 | Cook | 252—62.9 |
| 3,072,805 | 1/1963 | Rich | 310—8.1 |
| 9,976,246 | 3/1961 | Egerton | 252—62.7 |
| 2,724,171 | 11/1955 | Wallace | 310—8 |
| 3,217,164 | 11/1965 | Williams | 310—8.7 |
| 2,911,370 | 11/1959 | Kulcsar | 252—62.9 |
| 3,021,441 | 2/1962 | Howatt | 310—8 |

J. D. MILLER, *Primary Examiner.*